United States Patent [19]

Foulkes

[11] 4,124,042
[45] Nov. 7, 1978

[54] MANUFACTURE OF BATTERY PLATES

[75] Inventor: Stanley Charles Foulkes, Bolton, England

[73] Assignee: Chloride Group Limited, London, England

[21] Appl. No.: 758,143

[22] Filed: Jan. 10, 1977

Related U.S. Application Data

[62] Division of Ser. No. 623,897, Oct. 20, 1975, Pat. No. 4,037,630.

[30] Foreign Application Priority Data

Oct. 18, 1974 [GB] United Kingdom ............... 45241/74
Dec. 23, 1974 [GB] United Kingdom ............... 55500/74

[51] Int. Cl.² ............................................. B65B 3/04
[52] U.S. Cl. ..................................... 141/1.1; 141/32; 222/318
[58] Field of Search ................... 141/1.1, 32; 222/318; 136/67, 27, 43; 429/225

[56] References Cited

U.S. PATENT DOCUMENTS 2,949,940  8/1960  Lozo ...................................... 141/32
3,570,717  3/1971  Olson ................................... 222/318

Primary Examiner—Houston S. Bell, Jr.
Attorney, Agent, or Firm—Oblon, Fisher, Spivak, McClelland & Maier

[57] ABSTRACT

There is disclosed apparatus for filling enveloped plates for batteries with active material which comprises at least one filling station comprising means for supporting the envelope of a plate assembled on its current conducting element in a substantially vertical plane and a filling manifold adapted to introduce a slurry of active material into the envelope of a plate located in the said supporting means, the apparatus further comprising, a slurry storage tank adapted to contain a supply of active material slurry and provided with agitating means for maintaining the active material in the storage tank in suspension as a slurry, and delivery means for delivering slurry from the storage tank to the manifold of a selected filling station.

33 Claims, 15 Drawing Figures

MANUFACTURE OF BATTERY PLATES

This is a division, of application Ser. No. 623,897 filed Oct. 20, 1975 now U.S. Pat. No. 4,037,630.

BACKGROUND OF THE INVENTION

1. Field of the Invention

This invention relates to the manufacture of battery plates especially those of tubular type and is concerned in particular with the filling of the tubes of such plates, novel apparatus for carrying out the method and novel active material paste composition.

Tubular plates can have a variety of different types of tube material and tube configurations and can have tubes joined together or formed as separate tubes which are separately located on the spines.

One example of such separate tube arrangements utilizes woven fabric tubes having a thin outer plastic sheath provided with perforations about 1–2 mm across spaced apart by about 1 to 2 mms. The plastic sheath is about 0.1 to 0.2 mms thick.

The invention, though not limited to such arrangements, however is described with particular reference to tube arrangements in which the tubes are a single preformed assembly since this facilitates assembly of the tubes onto the spines of the plate.

2. Description of the Prior Art

A conventional method for making tubular plates involves impregnating fabric tubes with a resin to render them stiff though still permeable, locating the tubes on an array of lead alloy spines, one spine to each tube, and filling the space between the interior of the tubes and the spines with active material e.g. lead oxide powder from a hopper and shaking the assembly to compact the powder in the tube. This method has considerable problems including waste of lead oxide powder, inconsistency of filling weight, and unevenness of filling, the active material tending to become over consolidated at what is the bottom of the tubes during filling but is the top of the tubes in use.

One proposal, in G.B. Patent No. 947796, for reducing these problems was to extrude an active material paste containing a water soluble thickening agent into the tubes under high pressure. However, this method resulted in plates which had unpredictably variable electrical performance. There was also a tendency for the paste to break down and lose its fluidity under pressure and also to go solid inside the machinery if there were any intervals or delay in the production sequence.

Another proposal, in German Auslegeschrift No. 2243377 is to inject a metered volume, corresponding to the internal volume of the tubular plate, of an acidic automotive battery paste into the tubes within a very short space of time e.g. less than 1.5 seconds. The paste has a certain amount of additional water added to it. This is alleged to form a suspension but in fact this mixture is a thick paste which is not self levelling. The pastes which are disclosed contain 3 parts grey lead oxide, 1 part red lead oxide, 2.96 parts by weight of oxides to each part by weight of acid and water and 0.06 parts by weight of 1.4 specific gravity sulphuric acid for each part by weight of oxide, i.e. 12.6% of the grey lead oxide was sulphated. The specification decribes the pastes as having dynamic viscosities in the range 3000 to 4000 centipoises. No indication is given of what method of measurement of viscosity or measuring apparatus is to be used.

We have measured the viscosity of the above paste described in German Auslegeschrift No. 2243377 on a rotating vane viscometer as described below using the measurement technique described below.

We find that this paste has a rotating vane viscometer torque value (as defined herein) of 3.5 lbs ft. The paste is not self levelling; that is when a mass is deposited as a lump on a flat surface it does not assume a flat level surface within a period of 24 hours, though small amounts of liquids separate outfrom the solids during this period.

The process has the disadvantages of requiring accurate metering of the volume of paste to be injected and the paste is so viscous that it has to be forced into the tubes under high pressure.

This needs to use high pressure results in variation in density of the paste along the length of the tubes, the paste tending to become over consolidated at the inlets to the tubes which are the bottoms of the tubes in use. In addition it introduces difficulties in getting the paste to travel the full length of a tube, especially in a deep plate. This severely limits the size of plate which can be filled. This introduces further problems in production of batteries from the paste and in use of the batteries.

We have discovered that these problems can severally and collectively be reduced by using a radically different active material composition, apparatus and method in which a pourable liquid slurry of very low viscosity is poured or fed into the tubes under gravity and then, when the tubes are full, preferably consolidated by allowing the back pressure to build up. By controlling the value to which the back pressure is allowed to rise, the degree of consolidation can be varied as desired and a very even consolidation achieved.

The method of the present invention is described and claimed in corresponding U.S. Pat. No. 4,037,630 with the present application being a Divisional application thereof.

The apparatus for carrying out the method in accordance with the invention preferably comprises at least one filling station comprising means for supporting the envelope of a plate assembled on its current conducting element in a substantially vertical plane and a filling manifold adapted to introduce slurry into the envelope of a plate located in the said supporting means, the apparatus further comprising, a slurry storage tank provided with agitating means adapted to contain a supply of active material slurry, and delivery means for delivering the slurry from the storage tank to the manifold of a selected filling station wherein the plate comprises a plurality of tubular plate members.

The delivery means preferably include recirculating means for recirculating the slurry to the storage tank when the slurry is not being delivered to a filling station.

The delivery means may comprise a pump having an inlet pipe communicating with the storage tank and valve means, the recirculating valve, communicating with the outlet of the pump for directing, preferably selectively station, or when more than one station is used, to a selected station, or for recirculating the slurry to the storage tank.

The means for supporting the plates are preferably adapted to support tubular plates and comprise a frame rigidly secured to the filling manifold and carrying top and bottom clamps arranged to releaseably clamp the plate to the frame.

The clamps may be toothed and conform to the outside surface profile of the bottom and top of the tubular plate.

At least the top clamp is preferable provided with a resilient sealing liner.

The manifold of preferably adapted for use with tubular plates and then preferably has an outlet nozzle assembly consisting of rigid feed tubes spaced apart in a straight line with their centers on the centers of the tubes of the plate and having external diameters corresponding to the internal diameters of the tubes of the plate. Thus the tubes are preferably arranged vertically so that the slurry is introduced under gravity.

The feed tubes may extend through a resilient gasket, the dimensions of the frame in relation to the plate being such that the end of the plate has to be forced up into the gasket in order to locate the plate in the supporting means.

Preferably a pressure responsive valve is located in communication with the inlet side of each filling manifold.

Preferably at least two filling stations are provided for each pump and slurry storage tank and the recirculating valve is a three way valve.

The or each pressure responsive valve may be arranged to actuate automatic switching of the recirculating valve or the valve means connecting the or each manifold to the common feed pipe to the recirculating position and to release the pressure on the plate as soon as a preset pressure is reached.

The pump preferably comprises a rotor in the form of a single start helix fitting in a cylinder in the form of a double start helix of twice the pitch of the rotor, in which the rotor turns about its own axis in one direction, while its axis orbits about the axis of the cylinder in the opposite direction at the same speed.

In a further broader aspect of the invention the method is not restricted to the filling of tubular sheathed plates. Thus other shapes of sheath can be used, e.g. envelope shaped sheaths and in this case the grid need no longer be in the form of a comb of spines but could be a conventional cast grid or a reticulated plate, e.g. an expanded metal mesh or a sheet with apertures punched through it, it could even be a solid plate so long as the necessary current collecting function was adequately carried out.

The sheath can be of flexible material or of rigid or stiff material but at least when the sheath is flexible it is preferred to support its faces with porous support means, e.g. rigid foraminous sheets, meshes or grids during the filling operation so as to keep the plate substantially parallel sided while permitting the liquids to pass through.

With this arrangement the inlet manifold also has to be modified so that, instead of a row of tubes which plug into the ends of the individual tubes of the sheath, a single or double tubular slot is provided to plug into the open bottom end of the sheath. A double slot arrangement which nests over the end of the grid and affords a pair of slots extending along either side of the grid and can be clamped thereto may have advantages over a single slot arrangement.

The end of the sheath can be sealed with an elongated bottom bar after filling. This can consist of an internal plug gripping the end of the grid and an external clip or integral flange on the plug arranged to grip the outside of the envelope and hold it in against the plug.

In another alternative instead of an inlet manifold of fixed tubular outlets or fixed slots an arrangement of retractable filling tubes extending down into the sheath can be used. The arrangement would start with the filling tubes fully extended down into the sheath around the spines (which now need not have centering fins since the filling tubes perform this function). As the active material issues from the ends of the tubes the tubes are withdrawn up along the sheath and finally halt at the open top end of the sheath where they may be momentarily clamped and then released to complete filling of the plate.

Clearly however this arrangement is more complicated than the arrangement in which the slurry is merely fed in at the tops of the tubes and this simple arrangement is much preferred.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
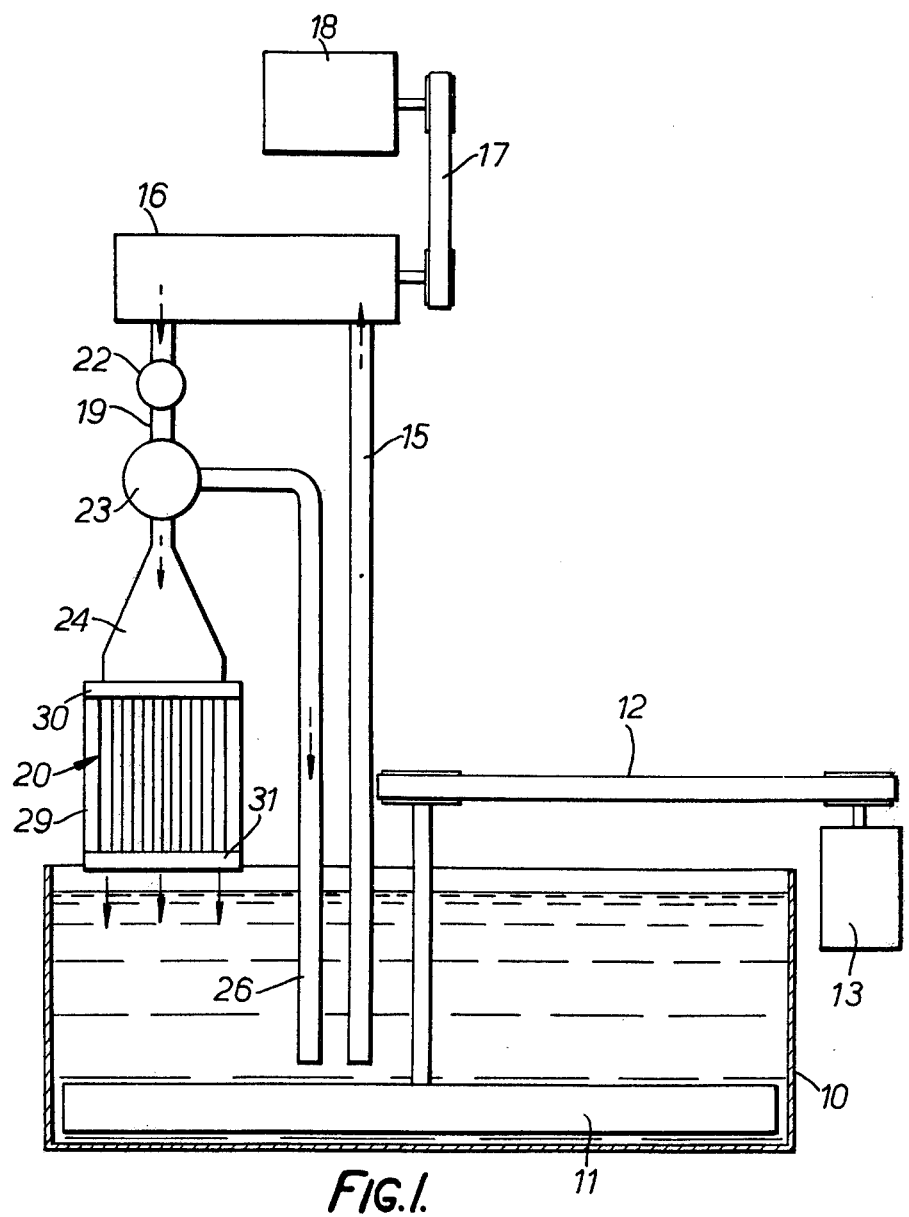
FIG. 1 is a diagrammatic side elevation of one embodiment of apparatus in accordance with the invention.
Figure 2:
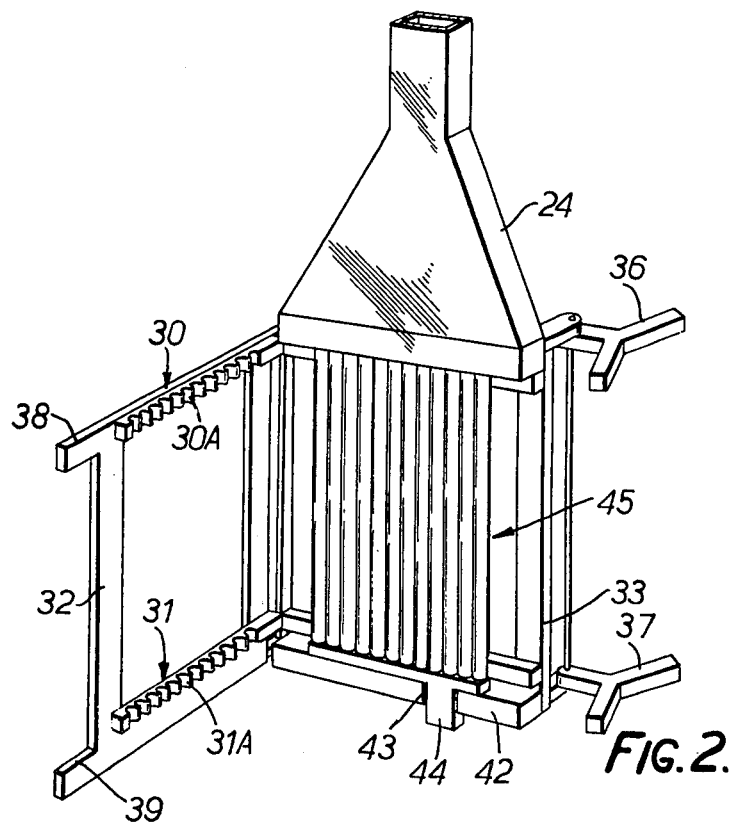
FIG. 2 is an enlarged diagrammatic perspective view of the filling box shown in FIG. 1.
Figure 4:
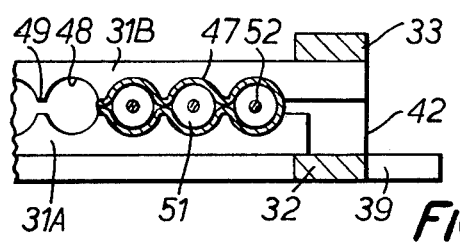
FIG. 4 is a cross-sectional plan view on the line IV—IV of FIG. 3.

The apparatus consists of a slurry tank 10 in which the slurry to be filled into the plate tubes is stored. The tank is fitted with a paddle 11 located at the bottom of the tank and driven by a belt and pulley drive 12 from a variable speed motor 13. A vertical feed tube 15 extends up from just above the paddle 11 to the inlet to a supply pump 16 which is also driven by a belt and pulley drive 17 from a variable speed motor 18. The outlet of the pump 16 is connected vertically downwards by a supply pipe 19 to a plate filling station 20. The supply pipe proceeds via a pressure gauge 22 a two-way valve 23 and a fishtail manifold 24. The valve 23 either permits the slurry to flow vertically downwards to the station 20 or can be positioned to direct the slurry to the tank 10 via a recirculating tube 26 which extends down to just above the paddle 11. The tubes 15 and 26 are preferably of the same cross-sectional area.

The mass of the supply of slurry is preferably maintained at about 150 kg., or more broadly 100 to 200 kg., and the mass of slurry introduced into each tubular plate, the individual filling weight, is of the order of 400 to 1,000 gm. More broadly, the weight ratio of the active material, e.g., 75 kg, in the continuously mixed slurry supply to the individual filling weight is in the range 200 : 1 to 25 : 1, e.g., 160 : 1 to 100 : 1.

The station 20 comprises a frame 29 rigidly secured in relation to the manifold 24 and carrying top and bottom clamps 30 and 31.

The clamps 30 and 31 are toothed and conform to the outside surface profile of the bottom and top of the tubular plate since the plate is inserted in the clamps with its open bottom end facing the manifold 24. The manifold has an outlet nozzle assembly consisting of ¼ inch long copper or other rigid feed tubes with external diameters corresponding to the internal diameters of the plate tubes and spaced apart in a straight line, the centres of the feed tubes being on the centres of the plate tubes.

Thus the open ends of the plate tubes fit snugly over the feed tubes and are clamped thereto by the top clamp 30 which may be provided with a resilient sealing liner.

The lower clamp 31 holds the plate in position and presses the tubes against a thickened end section on the spines. The faces of the plate are completely free.

The spines are of conventional lead alloy composition and of conventional structure being located on a top bar at centres corresponding to the centers of the tubes with which they wil be used. They are desirably provided with short axial fins which are used to center the spines in the tubes and to prevent the spines being distorted during handling prior to filling.

The station 20 will now be described in more detail with reference to FIGS. 2 to 5.

As mentioned above, the station 20 comprises a frame 29 rigidly secured in relation to the manifold 24. This frame is in two parts 32 and 33 hinged to each other along the left hand edge, and it is the part 33 which is rigidly attached to the manifold 24. The top and bottom clamps are each in two parts 30A and 30D and 31A and 31B. 30A and 31A are carried by the movable part 32 of the frame 29 and 30B and 31B are carried by the fixed part 33 of the frame 29.

The fixed part 33 also carries top and bottom locking levers 36 and 37 which are arranged to engage top and bottom handles 38 and 39 on the movable frame part 32, and lock the filling station closed.

The fixed part 33 of the frame 29 also carries a bottom support bar 24 which has an aperture 43 through which the lug 44 of a plate 45 can pass and which assists in registering the plate in the filling station.

The top and bottom clamps 30 and 31 have toothed profile which conform to the external sheathed dimensions of the plate and the two portions of each clamp when closed define a row of cylindrical holes 48 connected by gaps 49 twice the thickness of the fabric 47 of the sheath so as to prevent the sheath being cut by the clamps.

The bottom clamp 31 presses the fabric 47 of the sheath against the broadened shoulders 51 of the spines 52 of the plate to ensure a tight seal. (See FIGS. 3 and 4).

Figures 3, 5:
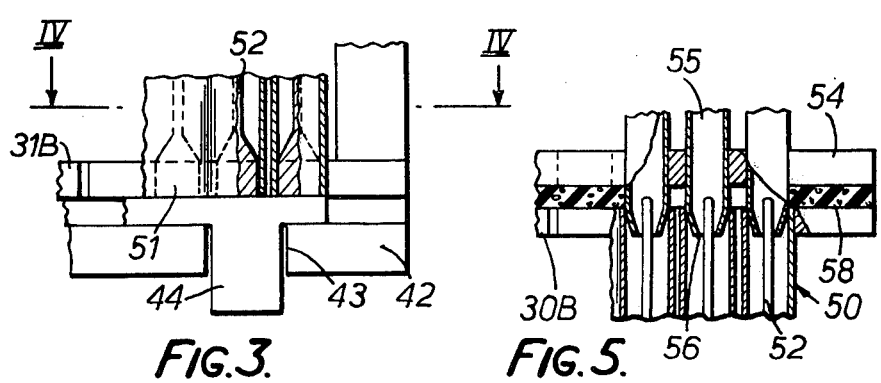
FIG. 3 is a diagrammatic view of part of the lower clamp shown in FIG. 2 in the open position, showing only some of the tubes of the plate.
FIG. 5 is a part cross-sectional view of part of the upper clamp in the open position, as in FIG. 3.

FIG. 5 shows the clamping arrangement at the manifold 24. A manifold plate 54 has a row of feed tubes 55 passing down through it and having narrowed ends 56 which extend through apertures in a rubber gasket 58. It is resilient being compressible by finger pressure to only about half its uncompressed thickness, which is about 1/8 inch thick. FIG. 5 shows the fabric 47 in position over the ends 56 of the feed tubes. However, the arrangement is in fact such that the gasket 58 has to be compressed by about 1/16th inch by the sheath 47 being forced up into it in order to get the top bar of the plate onto the bottom bar 42 of the frame. (This compression has not been shown on the drawing). The clamp 30 presses the fabric 47 of the sheath around the ends of the feed tubes 56 of the feed tubes 55 to achieve a good top seal. Thus the tubes are filled while vertical with their top bar at the bottom.

The pump 16 is one which gives smooth delivery and is of the well known type, such as that marketed under the trade name MONOPUMP, which comprises a rotor in the form of a single start helix fitting in a cylinder in the form of a double start helix of twice the pitch of the rotor, in which the rotor turns about its own axis in one director while its axis orbits about the axis of the cylinder in the opposite direction at the same speed. This form of pump gives a positive displacement with uniform flow, and prevents the separation of liquids and solids in the slurry.

In another arrangement (not shown) the filling station 20 is formed as a twin manifold arrangement each manifold being fed from the pump 16. The two way valve 23 is replaced by a three way valve and coach line from the valve 23 to a manifold contains a pressure responsive valve 70.

This valve 70 is preferably a pressure release valve which can be set to any desired pressure e.g. 15 psi and when this pressure is reached will hold the pressure at 15 psi until actuated, e.g. manually.

The procedure would then be for a plate to be inserted in one manifold and the valve 23 switched either from recirculation or from the other manifold. The plate would fill e.g. in 5 seconds and then the pressure would rise to 15 psi and be held there for 5 seconds. During this time the operator would have removed the filled plate from the other manifold and inserted a new plate. He could then switch the valve 23 either to recirculate momentarily or immediately to fill the new plate.

In an alternative arrangement the pressure release valves 70 is arranged to switch the pump supply to recirculation and release the pressure on the plate as soon as the preset pressure is reached.

In operation, the filling process is as follows.

The slurry is made up to the desired composition in the tank 10 by use of the paddle 11. A tubular plate 50 is assembled, the non-woven fabric tubes 47 being located on the metal spines 52, and it is positioned against the clamps 30B and 31B at the station 20 with its open bottom ends pushed up against the gasket 58 and over ends 56 of the feed tubes 55 of the manifold 24. The part 32 of the frame is then swung closed against the part 33 and the clamps 30 and 31 thus closed and the locking arms 36 and 37 secured over the handles 38 and 39. The paddle 11 is kept in operation and the valve 23 is turned to the recirculating position connecting the pump 16 to the tube 28 and the pump 16 is switched on. Recirculation is carried out until the flow is steady. The pressure indicator 22 indicate zero pressure while recirculating is occurring.

The valve 23 is then switched to connect the pump 16 to the manifold 24. The slurry passes down through the station 20, some of the active material settling into the interior of the tubes while excess liquid and active material drains through the fabric 47 of the tubes and back into the tank 10. The valve 23 is maintained in this position until the tubes have filled with active material at which point the pressure indicator 22 indicates a relatively sudden increase in pressure. The valve 23 is then switched to recirculate the slurry to the tank 10 via the pipe 26.

The clamps 30 and 31 are then opened and the filled plate removed and the further processing operations such as bottom bar insertion, pickling, drying and electrolytic formation carried out on the plate.

The excess slurry in the manifold 24 falls down into the tank 10.

In continuous operation, the pressure rise indicated by the indicator 22 could be used to control the filling cycle, e.g., to activate the valve 23, and open the clamps 30 and 31 to disengage it from the manifold 24 and re-engage a new plate in the clamped position. Limit switches could be provided, which would be activated by the new plate engaging the manifold 24 to divert the valve 23 back to the filling position.

In the modification shown in FIGS. 6 to 15 two or more, e.g. three, satellite filling arrangements as shown in FIGS. 1 to 5 are supplied with slurry from a central slurry reservoir and make-up tank which is mounted on a balance so that it can be continuously weighed. The reservoir is continuously stirred and is provided with a float controlled water supply so as to maintain the volume of slurry constant. The slurry starts off at an oxide to water ratio of 1.5:1. Each satellite filling arrangement is supplied with slurry by a variable speed pump. Once the weight of the reservoir has dropped by 1200 lbs and the oxide water ratio has fallen to 1.2:1 the pumps to the satellites are switched off. 800 lbs of red oxide and 400 lbs of grey oxide are added. The oxide water ratio in the satellites falls to about 1:1 while this is being done. When the feed from the reservoir to the satellites is recommenced the solid/liquid ratio is reestablished.

In this arrangement it is preferred to increase the volume of the tank 10 in the satellite filling arrangement so that when the supply from the main tank is switched off during replenishment the oxide to water ratio does not fall too much. Thus the mass of slurry is preferably in the range 500–625 kg and thus the weight ratio of the active material in the slurry to the individual filling weight (e.g. 200–1200 grams) is in the range 1300:1 to 200:1 e.g. 1000:1 to 250:1. The mixing of the slurry continues in the reservoir during the oxide addition and once this is completed the pumps to the satellites are switched on again.

Figure 10:
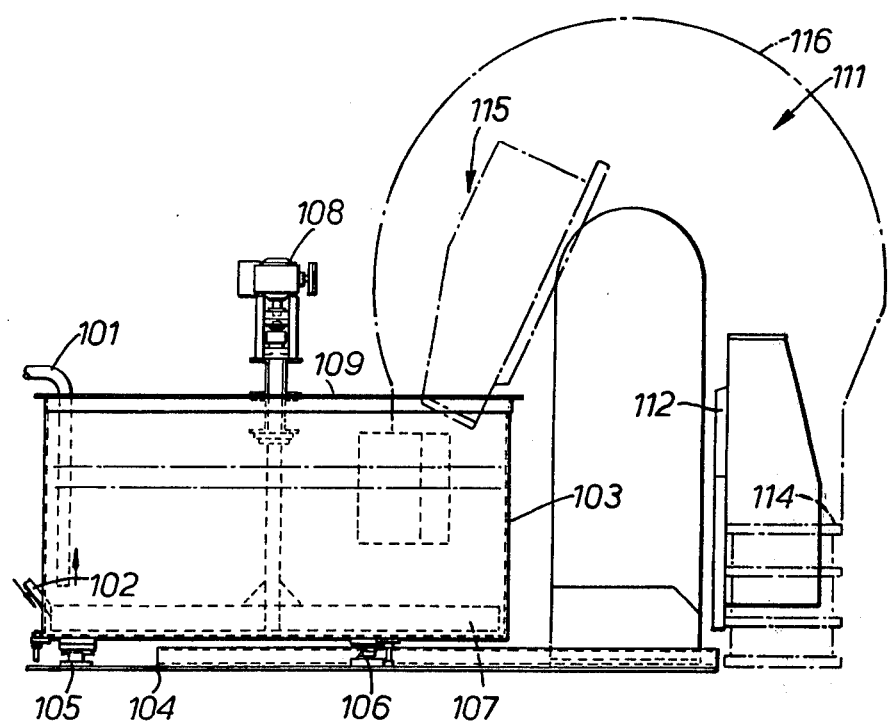
FIG. 10 is a side elevation of the station shown in FIG. 9.
Figure 12:
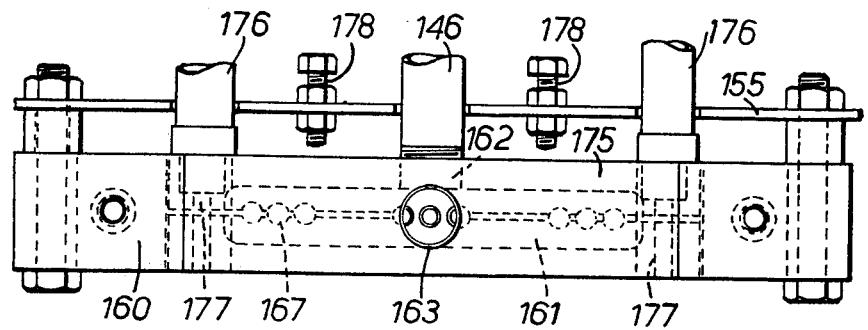
FIG. 12 is a plan view of the filling manifold shown in FIG. 11.
Figure 13:
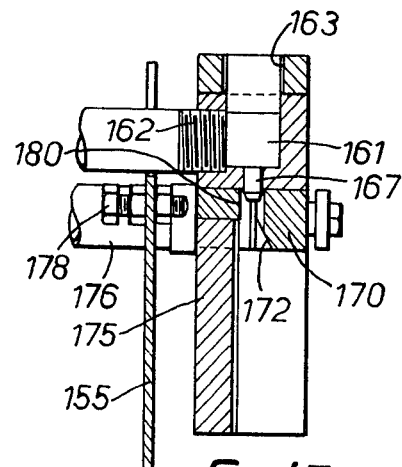
FIG. 13 is a cross sectional view on the line XVII—XVII of FIG. 11.

The central slurry preparation station 100 is shown in FIGS. 13 and 10. The preferred form of satellite filling apparatus 130 is shown in FIGS. 6 to 8 and 11 to 15.

Three such identical filling apparatus 130 are preferably fed by the central station 100 by a pumped supply pipe 101 and a pumped or gravity return pipe 102.

The central station comprises a circular slurry tank 103 mounted on a base plate 104 via a load cell 105 and a pair of cross spring flexures 106. The load cell and flexures are placed on the corners of an equilateral triangle. A vertical paddle 107 is mounted for rotation about a vertical axis in a horizontal plane at the bottom of the tank 103 and is driven by a motor 108 so as to maintain the solids in suspension in the tank 103. The tank has a lid 109 with a shrouded aperture 110 (not shown) through which a powder supply mechanism 111 can tip powder into the tank 103.

The powder supply mechanism 111 consists of a hoist 112 having a cradle 113 arranged to engage a drum 114 of active material and lift it up and around a circular path and tip it into the tank at the position 115 shown in chain lines in FIG. 10. The mechanism 111 is enclosed in a shroud 116 as indicated in chain lines in FIG. 14. The tank 103 is kept topped up with water by means of a ballcock 117.

Figure 6:
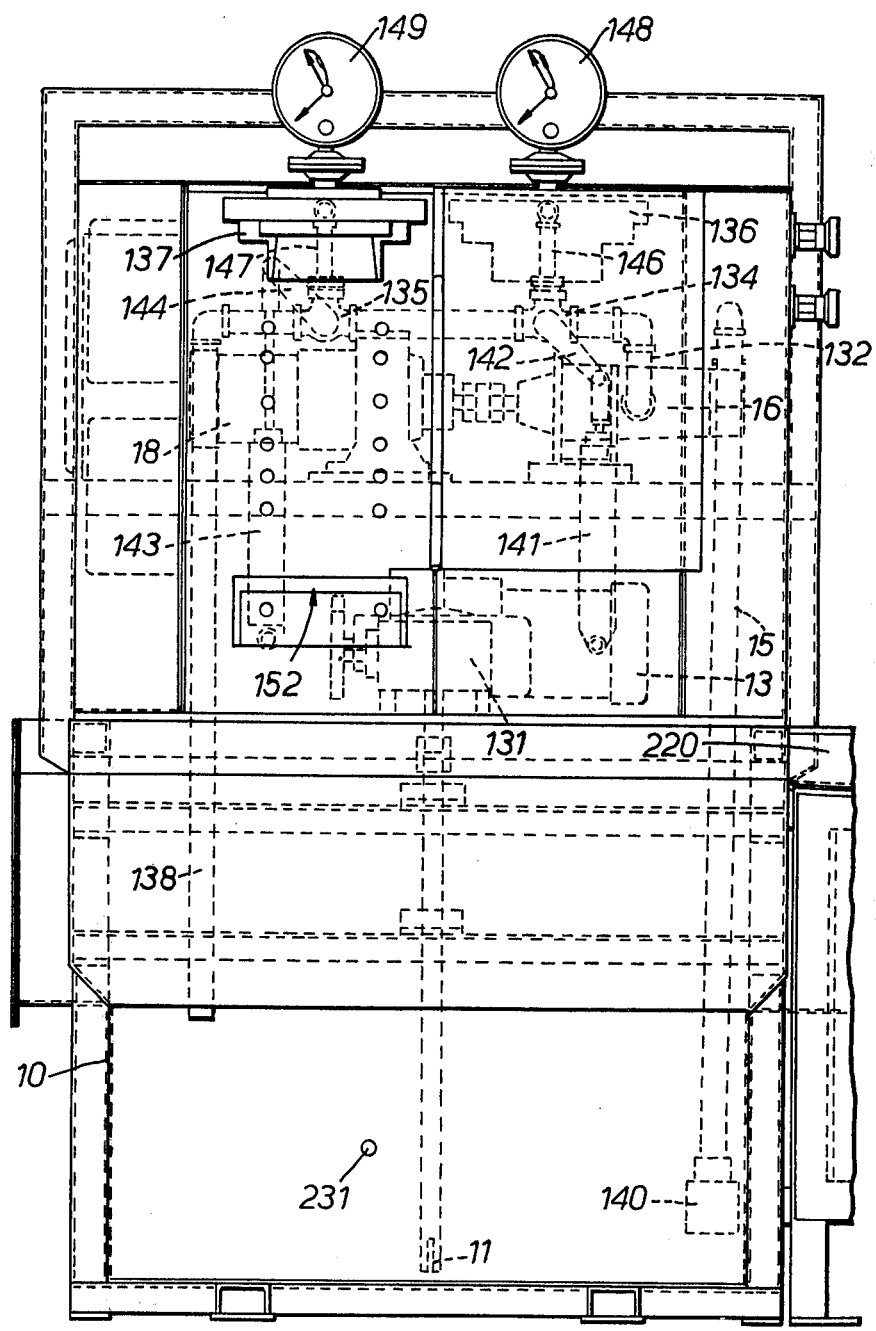
FIG. 6 is a front elevation of a preferred form of satellite filling station for use in a modification of the invention in which a central slurry preparation station supplies slurry to a number of satellite filling stations.
Figure 7:
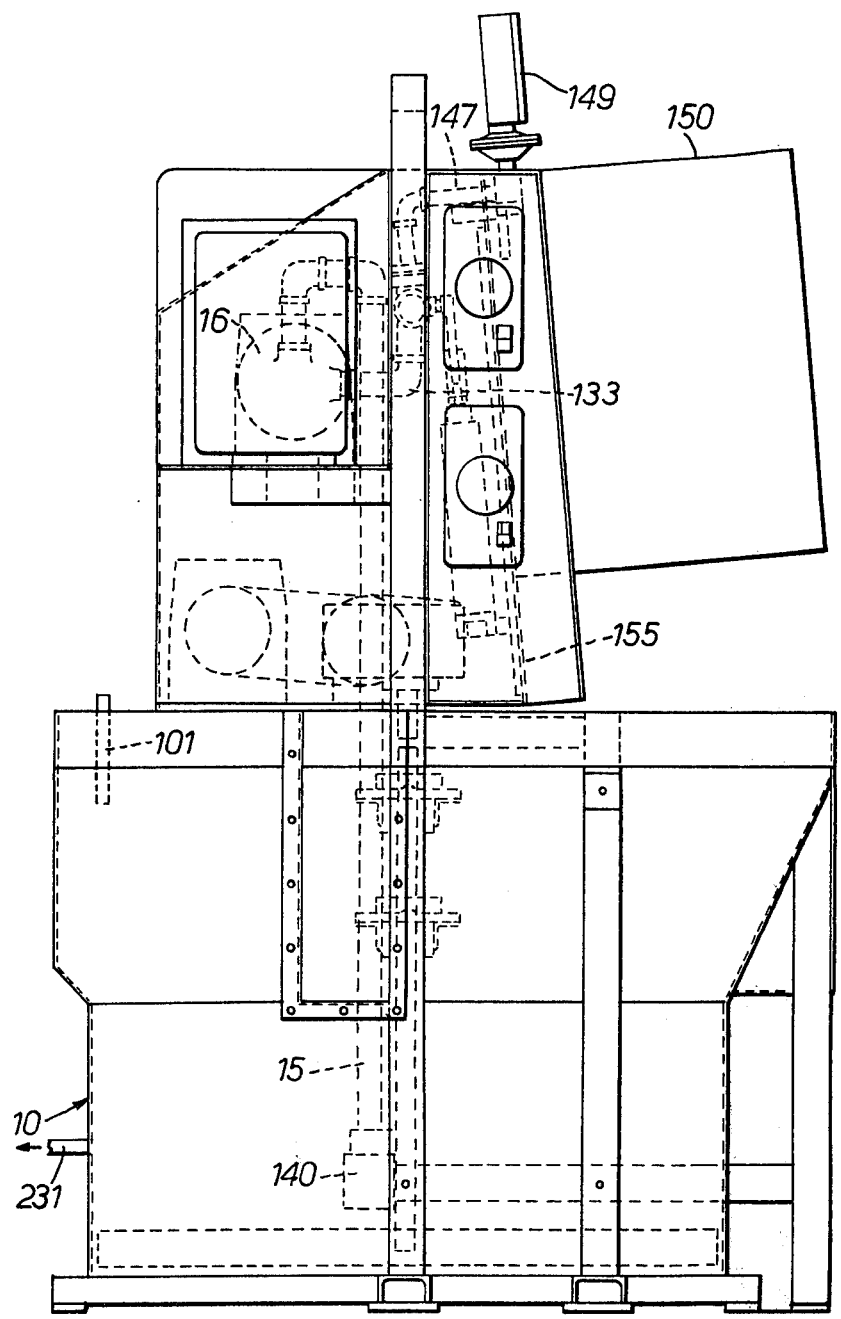
FIG. 7 is a side elevation of the satellite filling station shown in FIG. 6.
Figure 8:
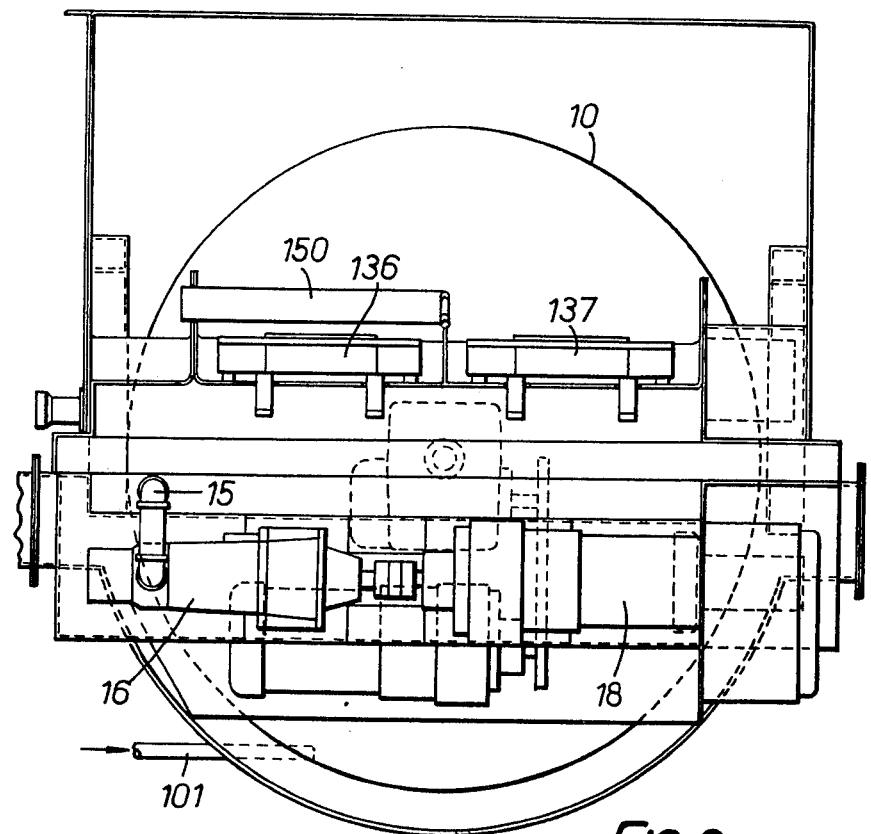
FIG. 8 is a plan view of the satellite filling station shown in FIG. 6.
Figure 9:
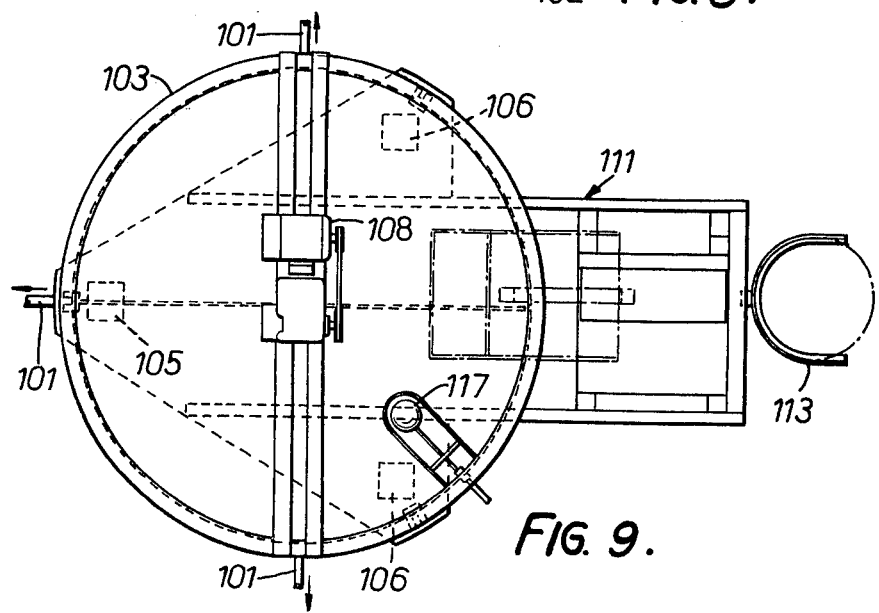
FIG. 9 is a plan view of the central slurry preparation station referred to above in connection with FIG. 6.

We refer now to the preferred form of filling apparatus as shown in FIGS. 6 to 8. This is closely similar in general arrangement to the apparatus shown in FIGS. 1 to 5 and the same reference numerals will be used for the same parts.

Thus the slurry tank is fitted with a paddle 11 located at the bottom of the tank and driven by a variable speed motor 13 via a gear box 131. A vertical feed pipe 15 with a filter 140 at its lower end extends up from just above the paddle 11 to the inlet to a MONOPUMP supply pump 16 driven by a variable speed motor 18.

The outlet 132 of the pump 16 is connected to a common supply pipe 133 which extends past a pair of inlet valves, 134 and 135 to a pair of filling manifolds 136 and 137, on to a recirculation pipe 138 which extends down to the slurry tank 10.

The valve 134 is under the control of a pneumatic cylinder 141 and crank 142 and is arranged to always be either open to the manifold or on bypass. The valve 135 is similarly arranged. The valve 135 is under the control of a similar cylinder 143 and crank 144.

The valves 134 and 135 supply the manifolds 136 and 137 via pipes 146 and 147 which extend up from the valves to the manifolds so that any settlement in these pipes will tend to be in the region of the valves 134 and 135 and can be readily flushed out. Pressure gauges 148 and 149 are placed in the pipes 146 and 147 and are arranged with pressure cut off devices so that as soon as the pressure in the pipe 146 or 147 reaches a predetermined value, which can be preset as desired, the cylinder 141 or 143 is automatically actuated and the supply from the pump is switched to bypass and is returned via pipes 133 and 138 to the tank 10.

The cylinders 141 and 143 are also arranged to be under the control of switches actuated by a door 150 (though this can be bypassed if desired). The door 150 on being closed over one manifold e.g. 136 in FIG. 8 switches the valve 134 from bypass to feed and the slurry is supplied to the manifold 136. When the pressure rises and cuts off, the door 150 can then be swung to the other side to actuate the valve 143 for the other filling manifold 137.

The filling manifolds 136 and 137 are associated with bottom clamps 152 only one of which is shown in FIG. 6 for clarity in the drawings. The manifolds and bottom clamp are mounted on a backing plate 155 (see FIG. 7)

which is inclined backwards at a slight angle to the vertical so as to facilitate insertion of plates into the clamps and to prevent the plates falling out before the clamps are closed.

Figure 14:
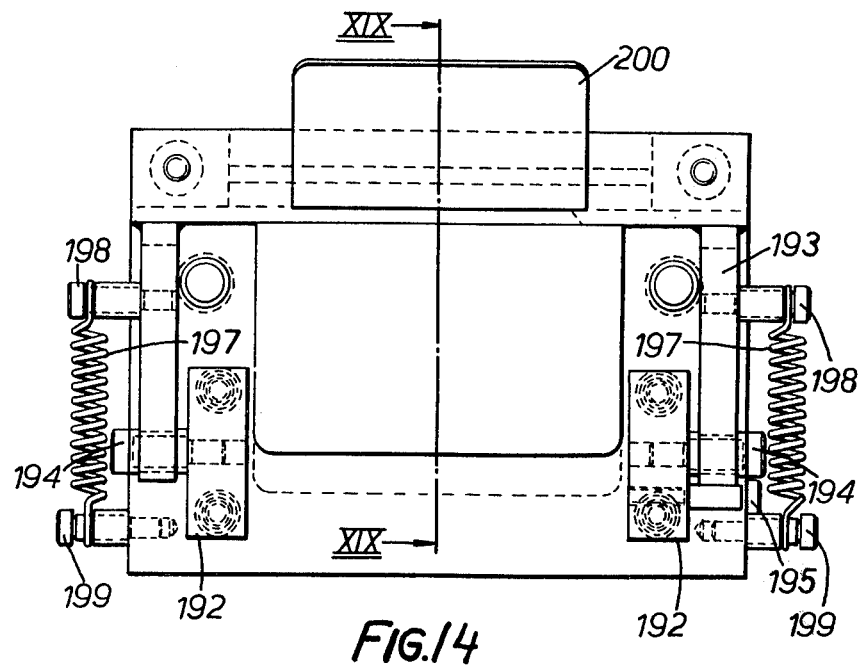
FIG. 14 is a front elevation of a preferred form of bottom clamp as used in the filling station shown in FIG.
Figure 15:
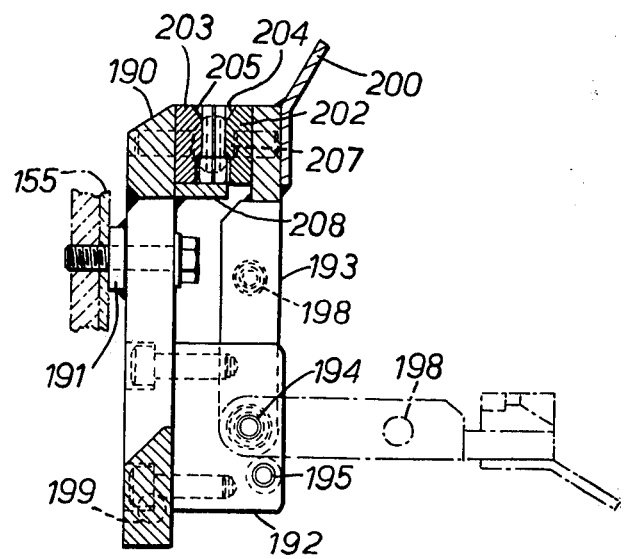
FIG. 15 is a vertical cross section on the line XIX—XIX of FIG. 14.

The filling manifolds are shown in greater detail in FIGS. 14 and 15.

Figure 11:
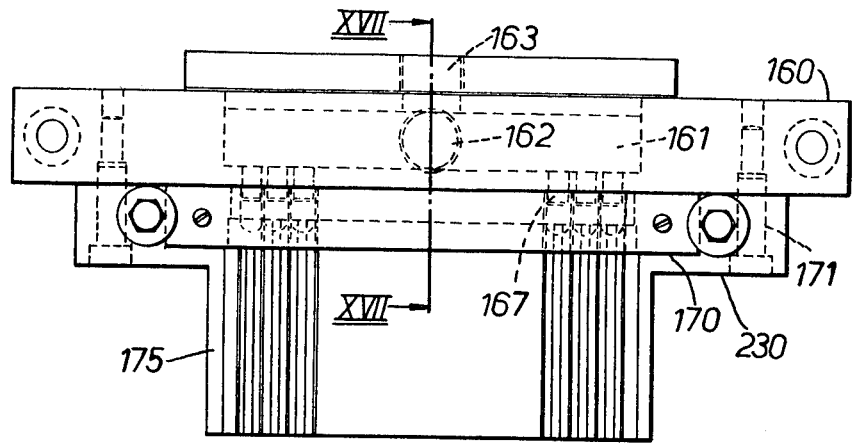
FIG. 11 is a front elevation of a preferred form of filling manifold and upper clamp as used in the filling station shown in FIG. 6.

Referring first to FIGS. 11 to 13 the manifolds consist of a manifold body 160 bolted to the mounting plate 155 and affording a rectangular horizontal slurry distribution cavity 161 which is fed from the rear by a central port 162 to which the pipe 146 or 147 is connected. At the middle of the top face of the cavity 161 there is a port 163 in which the pressure gauge 148 or 149 is located.

A row of nozzles 167 extends down from the bottom face of the cavity 161 out of the body 160 and it is over these short nozzles that the fabric tube is fitted and to which it is clamped. The clamping is achieved by a moveable front clamp face 170 carried in a frame 230 which is secured by vertical bolts 171 to the body 160. The inside face of the clamp 170 is a series of rounded teeth as in FIG. 5 but the teeth are chamfered as shown in FIG. 13 by the reference numeral 172.

The front clamp 170 co-operates with a moveable rear clamp 175 and the two clamps are actuated by a pair of pneumatic cylinders 176 mounted on pistons 177 which are secured to the front clamp 170.

The cylinders 176 are secured to the rear clamp 175 and thus when they are actuated to force out the pistons 177, they drive the clamp face 175 rearwards towards the mounting plate 155 and simultaneously drive the front clamp 170 forwards. The amount of such travel can be varied by means of the adjustable stops 178. The clamp 175 has a round toothed top edge 180 which clamps the rear edge of the fabric to the nozzles 167 and this edge 180 is also slightly chamfered as shown in FIG. 13. The clamp 175 also has a grooved skirt 181 to assist location of the plate in the clamp. Thus, the plate can be rested on the skirt 181 in the correct grooves and then slid up into the clamp.

Referring now to FIGS. 14 and 15 the bottom clamp 152 consists of a back frame 190 bolted to the mounting plate 155 but separated therefrom by a spacer 192 so that liquids issuing from a plate in the clamp can flow down behind it. A pair of side flanges 192 are bolted to the back frame 190 and a front frame 193 is hingedly attached by pivots 194 to these flanges. At least one of the flanges also carries a stop 195 to prevent the front frame 193 moving through more than 90° from the closed position. The front frame is held in the closed position or in the open position by an overcentre spring arrangement, a spring 197 extending on each side of the clamp from a pin 198 on the front frame to a pin 199 on the rear frame.

A finger grip 200 is attached to the outside top edge of the front frame. The opposed inside top edges of the back frame 190 and the front frame 193 carry co-operating round toothed clamps 202 and 203 both of which have their top inside edges chamfered as indicated at 204 and 205. The clamps are so dimensioned as to press the fabric of the tubing tight against the broadened shoulders 207 of the current collecting spines.

A horizontal bar or projection 208 extends out below the clamp 203 and is arranged to support the top bar of a plate and has a gap down through which the lug of the plate can extend.

Each satellite filling apparatus is provided with a work bench 220 and sink adjacent to the tank 10. Part of the work bench 220 is shown on the right hand side of the tank 10 in FIG. 6 of the drawings. This provides an area where the plant operator can insert a bottom bar in the open end of each plate, e.g. a conventional plastic e.g. polyethylene plug which is hammered onto the ends of the spines. A balance may also be provided to enable the operator to check the weight of each filled plate.

A monopump 230 (not shown) is located under the work bench in the supply line 101 from the tank 103 to the tank 10 and is arranged to pump about 10 gallons of slurry per minute into the tank 10, which has a capacity of about 30 gallons. The return pipe 102 is a gravity return and the filling apparatus 130 is thus preferably raised on staging about one foot above the floor level. A pumped return could however be used if desired.

If desired a larger tank eg of 50 gallons can be used. Thus the slurry in the tank 50 is desirably replaced about every 5 to 15, e.g. 10, minutes.

The apparatus is used as follows.

The slurry is made up to the desired composition in the tank 103 and then pumped continuously via pipe 101 by the pump 230 into the satellite tanks 10 and recirculated therefrom by an overflow pipe arrangement 231 connected to the return pipe 102.

The weight of slurry in the tank 103 is continuously or periodically measured by the load cell 105 and when it has dropped to a preset value a warning is given to the operator.

The slurry in the tanks 10 is continuously mixed and pumped by the pump 16 through the circuit; pipe 15, pump 16, pipe 132, valve 134 on by-pass, valve 135 on by-pass, pipe 138.

A plate comprising fabric tubes assembled on the current conducting splines having dimensions appropriate to the top and bottom clamps being used is located in one filling manifold e.g. 136 and the top and bottom clamps closed. The door 150 is now shut and if the automatic arrangement is in operation, the cylinder 141 switches the valve 134 to connect the pump 16 to the manifold 136. The plate fills, the pressure in the manifold cavity 161 builds up and at the preset value triggers the pressure gauge 148 which in turn actuates the cylinder 141 which moves the valve 134 back to by-pass.

As soon as the door 150 was shut, the operator could fit another plate into the manifold 137. Thus, as soon as the first plate has filled, he can start filling the next plate either before or after removing the first plate. The cycle can then be continued until the main tank 103 needs replenishing and this can if necessary be carried out by another plant operative.

At the end of a shift or whenever the filling station is to be left, it is prudent for the slurry to be pumped from the tank 10 back into the tank 103 and the filling station to be thoroughly cleansed and its pipe work flushed out with water.

The invention in its preferred form has referred to the plates being filled while in a substantially vertical plane and while in FIGS. 1 to 5 the plates are filled while vertically disposed, in FIGS. 16 to 15, and as shown in FIG. 7, the plates may be filled equally well when disposed at an angle of about 5° to the vertical.

It will be appreciated therefore that so long as the bed of active material can be built up evenly from the end remote from the inlet end with the space between the spine and the sheath being sufficiently evenly filled on both sides so as not to impair electrical performance, the exact angle at which the plate is disposed while filtration filling occurs is not critical.

Thus, while it is clearly prudent to maintain the plate at a steeply inclined angle, there is considerable room for variation. The angle will clearly vary depending on the length and diameter of the plate and the size of the spines. Thus, a very narrow annular space is being filled and so long as the maximum horizontal distance from side to side across the inclined tube is not many times, e.g. not more than 10 times the minimum transverse dimension of the tube or envelope, one may anticipate that no significant adverse effect on evenness of filling should arise.

Thus, in general, it may be possible to fill the tubes when they are inclined at angles of as much as 60° to the vertical though angles of up to only 20° to the vertical are probably more prudent.

The invention extends in its broader apparatus scope to a number of additional aspects.

Thus, in one alternative at least two filling stations are provided for each pump and slurry storage tank and the manifolds are fed by a common feed pipe connected from the outlet of the pump to the recirculating pipe and valve means are provided for selectively connecting each manifold to the feed pipe.

In another modification the top clamp comprises a fixed toothed face and a moveable co-operating toothed face arranged to be moved away from the fixed face while remaining parallel thereto by pneumatic or hydraulic means. In addition, in order to assist in liquid flow from tubes, at least one, and preferably both, of the opposed faces of the lower edge of the top clamp or the top edge of the bottom clamp, or preferably both clamps, is chamfered.

The rear face of the top clamp preferably carries a grooved member depending therefrom to assist location of a plate in the clamp.

In one form of the invention the bottom clamp has a front clamp face which hinges down from a back clamp face and biasing means are provided and are arranged to bias the front plate either to the closed position or to a fully open position.

The invention also extends to plant for filling enveloped battery plates which comprises a central slurry preparation station and at least one filling apparatus in accordance with earlier aspects of the invention and means for feeding slurry from the central station to the filling apparatus.

The means for feeding slurry preferably comprise means for continuously feeding slurry to the or each filling apparatus and return means for returning slurry to the central station whereby the slurry can be continuously circulated.

The slurry preparation station preferably comprises a tank, weighing means for enabling the tank to be weighed, agitating means to enable the slurry to be kept in suspension, and active material supply means and liquid supply means.

The weighing means preferably incorporate a load cell located below the tank.

The agitating means preferably comprise a paddle arranged to rotate at the bottom of the tank. The invention also extends to a method of using the plant which comprises continuously feeding slurry from the central preparation tank to each filling apparatus and back to the central tank at a rate such that the contents of the slurry tank of the filling apparatus is replaced at least every hour and preferably at least every half hour and more especially every 5 to 15 minutes.

In another alternative embodiment (not shown) the three filling apparatus arranged around the central slurry preparation station are instead arranged in a straight line with the central station either at the end of the line or in the line between adjacent filling apparatus. Up to six filling apparatus may be supplied with slurry from one central station. The supply pipe 101 and the return pipe 102 in this case are both supplied with a pump e.g. a MONOPUMP and may be constructed of 1 inch internal diameter hose or pipe.

An example will now be given of a specific plate production technique. This example is carried out on the apparatus described with reference to FIGS. 1 to 5.

The plates were positive plates having 15 tubes each 9 inches long. The tubes were made of non-woven polyethylene terephthalate fibre. This is made as follows:

A thin web (1.5 meters wide) of fibres having an average length of 4½ inches is produced by carding, and a fleece is produced by layering approximately ten webs to form a continuous length of non-woven fabric (also 1.5 meters wide).

The fibres extend generally longitudinally in the web, which is pleated in a zig-zag fashion as it is taken off from a conveyor travelling in the direction of the length of the web onto a conveyor travelling at right angles thereto. Thus the fibres extend substantially transversely to the length of the fleece, but due to the travel of the second conveyor the fibres in adjacent layers are oppositely inclined at a small angle to the transverse direction.

This material is then impregnated with 50% by weight of polyacrylic binder. It has a thickness of 0.5 to 0.7 mm. and weighs 120 to 160 grams/sq.cm.

This material is then converted into an array of tubes by passing two layers of it through a multiple sewing machine to secure the layers together along parallel lines (for example, spaced about 2 to the inch) to form pockets or tubes in the conventional manner.

This material is then dipped in a phenolic resin and dried. The material picks up 30% of phenolic resin based on the dry weight of the non-woven material. After cutting the material to length circular section mandrels 0.287 inches in diameter are then inserted between the rows of stitches to form the pockets. It has an air permeability of 8.0 liters/min/sq/cm. and a water permeability of 1.5 liters/min/sq. cm. area.

This non-woven fabric is made up of randomly entangled individual fibres. The fibres have a diameter of about 25 microns or more broadly 20 to 50 microns. The gaps between individual fibres are in general less than 250 microns and mostly les than 100 microns and moreover the material in having a thickness of 0.5 to 0.7 mms has a three dimensional structure permitting the overlap of many individual fibres in any one path from face to face of the sheet. The material has an excellent filtering activity for use in accordance with the present invention since while it permits passage of both liquids and solids in tube shape it rapidly fills with active material when this is fed or poured into the tubes under gravity.

Air permeability was measured as follows:

A sample 2.8 cm. in diameter (6.16 sq. cm. effective cross-sectional area) was clamped in position and the time for 50.1. of dry nitrogen to flow through the sample at 20° C under a pressure difference of 0.6 inches (1.5 cms) water gauge was recorded.

The material is too permeable for mercury porosimetry or air flow through an alcohol saturated sample to be accurate measurement techniques.

However, air permeability is known to be an accurate reflection of the filtering capacity of a material and thus materials suitable for use in this invention can be selected by measurement of their air permeability.

Water permeability was measured on the same sample by measuring the time taken for a column of water initially 42 cm. high and 1 liter in volume to flow under gravity through the sample.

The downstream end of the column below the sample was blocked off, the water introduced above the sample and then the downstream end below the sample opened to atmosphere.

The slurry used in this example 1 was made up from a mixture of 1 part grey lead oxide by weight (average particle size 20 microns) and 2 parts red lead oxide by weight (average particle size 5 to 10 microns) mixed in 1.5:1 weight ratio with mains water.

The tank 10 contained 150 kg. of slurry, the paddle 11, 30 inches by 1.5 inches, was rotated at 30 to 70 rpm, to maintain solids in suspension. The pump 16 was run at a volume throughput of 9.5, or more broadly 4 to 10 liters/minute, during recirculation the pressure indicator 22 showed zero pressure. Using the same stirring and pumping conditions, the valve 23 was switched to the fill position. The indicator 22 showed zero pressure for 5 seconds, and 15 psi after a further second when the valve 23 was again switched to recirculation. The internal volume of the tubes was 105 cc.

The volume of slurry passed through the plate was 0.8 liters i.e. the ratio of slurry volume to internal plate volume was 7.6:1.

Flow rates below 4 liters per minute were found to give rather slow filling rates and this reduced the productivity of the process, flow rates above 13 liters per minute were found with these particular cells to give rather low filling weights for the plates.

Thus while the slurry is introduced into the top ends of the tubes they fill from the bottom upwards, an oxide layer building up the tube evenly, and water and some oxide emerging through the fabric of the tube mainly at the level of the top surface of the active material in the tube. However, liquid also emerges through the whole filled length of the tube as well, as it is believed that further liquid is forced out of the whole length of the tube once the back pressure starts to build up.

The plate was then dried. The plates were weighed and the weight was 450 ± 20 grams. The plates were then pickled in conventional manner. Numerous plates were made in this way. Some were dissected and weighed, there being no significant weight variation between the top, middle and bottom of the tubes. Others had their electrical characteristics measured and compared with dry powder shaken plates using the same active material. These plates are referred to as standard plates.

The plates in accordance with the present invention had substantially the same discharge duration at the first and also at the tenth discharge in a standard charge/discharge procedure as did the standard plates.

Plates with individual internal tube volumes in the range 50 to 250 cc. can readily be filled.

We have found, as mentioned above, that the degree of densification and thus the total dry fill weight of the tubes can be controlled by control of the pressure which is allowed to build up at the end of the filling period.

Thus using the same slurry and tubes as described above, we have found that if the pressure is only allowed to build up to 5 or 7 psi, the weight is 420 grams ± 5%; if the pressure is allowed to build up to 15 psi, the weight is 450 grams ± 5% and if the pressure is allowed to build up to 35 psi, the weight is 500 grams ± 5%.

Moreover, the tubes are still filled evenly without stratification using these fill weights.

The active material in the tubes at 450 grams filling weight has a density of 4.3 grams/cc.

When this example was repeated using a paste of 3 parts oxide to 1 of water, (which had a density of 3.5 grams/cc), the material was essentially extruded into the tubes which filled in less than 1 second. No significant amount of liquor passed through the tubes, and the plates on testing demonstrated significant stratification of density in the tubes. This single example is believed sufficient to describe the mode of operation of the apparatus and attention is directed to the above-mentioned U.S. Pat. No. 4,037,630 for an ample disclosure of the particular formulations which can usefully be filled using the method of that case and the apparatus of the present application.

Obviously numerous modifications and variations of the present invention are possible in light of the above teachings. It is therefore to be understood that within the scope of the appended claims, the invention may be practiced otherwise than as specifically described herein.

What we claim as our invention and desire to secure by Letters Patent is:

1. Apparatus for filling enveloped plates for batteries with active material comprising at least one filling station comprising means for supporting the envelope of a plate assembled on its current conducting element in a substantially vertical plane and a filling manifold adapted to introduce a slurry of active material into the envelope of the plate located in the said supporting means, the apparatus further comprising, a slurry storage tank adapted to contain a supply of active material slurry, and provided with agitating means for maintaining the active material in the storage tank in a suspension as a slurry, and delivery means for delivering the slurry from the storage tank to the manifold of a selected filling station wherein the envelope of the plate comprises at least one porous tube.

2. Apparatus for filling enveloped plates for batteries with active material comprising at least one filling station comprising means for supporting the envelope of a plate assembled on its current conducting element in a substantially vertical plane and a filling manifold adapted to introduce a slurry of active material into the envelope of the plate located in the said supporting means, the apparatus further comprising, a slurry storage tank adapted to contain a supply of active material slurry, and provided with agitating means for maintaining the active material in the storage tank in a suspension as a slurry, and delivery means for delivering the slurry from the storage tank to the manifold of a selected filling station in which the delivery means include recirculating means for recirculating the slurry to the storage tank when the slurry is not being delivered to a filling station.

3. Apparatus as claimed in claim 1, in which the delivery means to the manifold comprises a pump having an inlet pipe communicating with the storage tank and valve means, a recirculating valve communicating with the outlet of the pump for directing slurry from the pump outlet to a filling station or for recirculating the slurry to the storage tank.

4. Apparatus for filling enveloped plates for batteries with active material comprising at least one filling station comprising means for supporting the envelope of a plate assembled on its current conducting element in a substantially vertical place and a filling manifold adapted to introduce a slurry of active material into the envelope of the plate located in the said supporting means, the apparatus further comprising, a slurry storage tank adapted to contain a supply of active material slurry, and provided with agitating means for maintaining the active material in the storage tank in a suspension as a slurry, and delivery means for delivering the slurry from the storage tank to the manifold of a selected filled station in which the means for supporting the plate are adapted to support tubular plates and comprise a frame carrying top and bottom clamps arranged to releaseably clamp the plate to the frame.

5. Apparatus as claimed in claim 4, in which the clamps are toothed and conform to the outside surface profile of the tubular plate.

6. Apparatus as claimed in claim 4 in which the opposed faces of the top edge of the bottom clamp are chamfered.

7. Apparatus as claimed in claim 4 in which the bottom clamp has a front clamp face which hinges down from a back clamp face.

8. Apparatus as claimed in claim 7, in which biasing means are provided and are arranged to bias the front plate either to the closed position or to a fully open position.

9. Apparatus for filling enveloped plates for batteries with active material comprising at least one filling station comprising means for supporting the envelope of a plate assembled on its current conducting element in a substantially vertical plane and a filling manifold adapted to introduce a slurry of active material into the envelope of the plate located in the said supporting means, the apparatus further comprising, a slurry storage tank adapted to contain a supply of active material slurry, and provided with agitating means for maintaining the active material in the storage tank in a suspension as a slurry, and delivery means for delivering the slurry from the storage tank to the manifold of a selected filling station, said plate comprising tubular plates and wherein the manifold has an outlet nozzle assembly consisting of rigid feed tubes spaced apart in a straight line with their centers on the centers of the tubes of the plate and having external diameters corresponding to the internal diameters of the tubes of the plate.

10. Apparatus for filling enveloped plates for batteries with active material comprising at least one filling station comprising means for supporting the envelope of a plate assembled on its current conducting element, in a substantially vertical plane and a filling manifold adapted to introduce a slurry of active material into the envelope of the plate located in the said supporting means, the apparatus further comprising, a slurry storage tank adapted to contain a supply of active material slurry, and provided with agitating means for maintaining the active material in the storage tank in a suspension as a slurry, and delivery means for delivering the slurry from the storage tank to the manifold of a selected filling station in which a pressure responsive valve is located in communication with the inlet side of each filling manifold.

11. Apparatus as claimed in claim 10 in which the pressure responsive valve is a pressure relief valve.

12. Apparatus as claimed in claim 10 in which the pressure responsive valve is arranged to actuate automatic switching of the recirculating valve to the recirculating position and to release the pressure in the supply line to the plate as soon as a preset pressure is reached.

13. Apparatus for filling enveloped plates for batteries with active material comprising at least one filling station comprising means for supporting the envelope of a plate assembled on its current conducting element in a substantially vertical plane and a filling manifold adapted to introduce a slurry of active material into the envelope of the plate located in the said supporting means, the apparatus further comprising a slurry storage tank adapted to contain a supply of active material slurry, and provided with agitating means for maintaining the active material in the storage tank in a suspension as a slurry, and delivery means for delivering the slurry from the storage tank to the manifold of a selected filling station in which at least two filling stations are provided for each pump and slurry storage tank and including a recirculating valve which comprises a three way valve for recirculating the slurry to the storage tank when the slurry is not being delivered to a filling station.

14. Apparatus as claimed in claim 13, in which pressure relief valving is located on the inlet side of each manifold.

15. Apparatus as claimed in claim 13 in which a pressure responsive valve is located on the inlet side of each manifold and each pressure responsive valve is arranged to actuate automatic switching of the recirculating valve which controls the manifold with which the said pressure responsive valve is associated, to the recirculating position and to release the pressure in the supply line to the manifold with which it is associated as soon as a preset pressure is reached.

16. Apparatus as claimed in claim 1 in which at least two filling stations are provided for each pump and slurry storage tank and the manifolds are fed by a common feed pipe connected from the outlet of the pump to the recirculating pipe and valve means are provided for selectively connecting each manifold to the feed pipe.

17. Apparatus as claimed in claim 16 in which a pressure relief valve is located on the inlet side of each manifold.

18. Apparatus as claimed in claim 16 in which a pressure responsive valve is located on the inlet side of each manifold and each pressure responsive valve is arranged to actuate automatic switching of the valve means connecting the manifold, with which the said pressure responsive means is associated, to the common feed pipe, to the recirculating position and to release the pressure in the supply line to the manifold with which it is associated as soon as a preset pressure is reached.

19. Apparatus as claimed in claim 1, in which the pump comprises a rotor in the form of a single start helix fitting in a cylinder in the form of a double start helix of twice the pitch of the rotor, in which the rotor turns about its own axis in one direction, while its axis orbits about the axis of the cylinder in the opposite direction at the same speed.

20. Apparatus as claimed in claim 1, in which a top clamp is provided below the filling manifold the top clamp comprising a fixed toothed face and a moveable co-operating toothed face arranged to be moved away from the fixed face by pneumatic or hydraulic means.

21. Apparatus as claimed in claim 20 in which the opposed faces of the lower edge of the top clamp are chamfered.

22. Apparatus as claimed in claim 20 in which the rear face of the top clamp carries a grooved member depending therefrom to assist location of a plate in the clamp.

23. Plant for filling enveloped battery plates which comprises a central slurry preparation station and at least one filling apparatus as claimed in claim 11 and means for feeding slurry from the central station to the filling apparatus.

24. Plant as claimed in claim 23 in which the means for feeding slurry comprise means for continuously feeding slurry to the or each filling apparatus and return means for returning slurry to the central station whereby the slurry can be continuously circulated.

25. Plant as claimed in claim 23 in which the slurry preparation station comprises a tank weighing means for enabling the tank to be weighed, agitating means to enable the slurry to be kept in suspension, active material supply means and liquid supply means.

26. Plant as claimed in claim 25 in which the weighing means incorporate a load cell located below the tank.

27. Plant as claimed in claim 25 in which the agitating means comprise a paddle arranged to rotate at the bottom of the tank.

28. A method of using the plant as claimed in claim 23 which comprises continuously feeding slurry from the central preparation tank to each filling apparatus and back to the central tank at a rate such that the contents of the slurry tank of the filling apparatus is replaced at least every hours.

29. Apparatus as claimed in claim 1, wherein said envelope of the plate comprises a plurality of metal spines and a plurality of non-woven fabric tubes located affording the envelope for said plate one on each of said metal spines.

30. Apparatus as claimed in claim 11, wherein the envelope of the plate comprises a plurality of porous tubes and said filling manifold includes a plurality of feed tubes, the end portions thereof being disposed within corresponding upper portions of said porous tubes.

31. Apparatus as claimed in claim 1, wherein the envelope of the plate comprises a plurality of porous non-woven fabric tubes and the said enveloped plates comprise a plurality of metal spines with the said plurality of porous non-woven fabric tubes located one on each said metal spines and wherein said filling manifold includes a plurality of feed tubes, the end portions thereof being disposed within corresponding upper portions of said porous tubes.

32. Apparatus as claimed in claim 1, in which the means for supporting the plates are adapted to support tubular plates and comprise a frame carrying top and bottom clamps arranged to releasably clamp the plate to the frame.

33. Apparatus as claimed in claim 32, including means for locking said top and bottom clamps mounted on said frame.

* * * * *